Jan. 19, 1954  N. BURR ET AL  2,666,414
COLLAPSIBLE BIRDHOUSE
Filed April 13, 1951  2 Sheets-Sheet 1

INVENTOR:
NED BURR
FRED DRUECK JR.
BY: Schroeder, Merriam,
Hofgren + Brady.
ATTORNEYS:

Jan. 19, 1954   N. BURR ET AL   2,666,414
COLLAPSIBLE BIRDHOUSE
Filed April 13, 1951   2 Sheets-Sheet 2

INVENTOR:
NED BURR
FRED DRUECK JR.
BY: Schroeder, Merriam,
Hofgren, + Brady,
ATTORNEYS:

Patented Jan. 19, 1954

2,666,414

UNITED STATES PATENT OFFICE 2,666,414

COLLAPSIBLE BIRDHOUSE

Ned Burr, Homewood, and Fred Drueck, Jr., Chicago, Ill., assignors to Chicago Cardboard Company, a corporation of Illinois Application April 13, 1951, Serial No. 220,854

10 Claims. (Cl. 119—23)

This invention relates to a collapsible birdhouse, or the like, and in particular it relates to a bird house which may be formed from a single piece of paperboard in a conventional cutting and scoring operation.

Heretofore, insofar as applicants are aware, bird houses and similar small covered containers of a generally decorative and house-like appearance (such as might be used for note boxes or letter boxes) have been made of wood or sheet metal and have thus been relatively expensive to produce.

The device of this invention is a bird house of pleasing appearance which may be inexpensively produced from a single piece of paperboard in a cutting and scoring operation such as has been used for many years in the manufacture of display devices. The device is preferably formed from what is known as outdoor board—that is, paperboard in which the laminae are fastened together with waterproof adhesive, and in which the decorative paper surface is applied to the paperboard with waterproof adhesive and the entire board is coated with a waterproof lacquer so that the finished board has considerable weather resistance.

Figure 7:
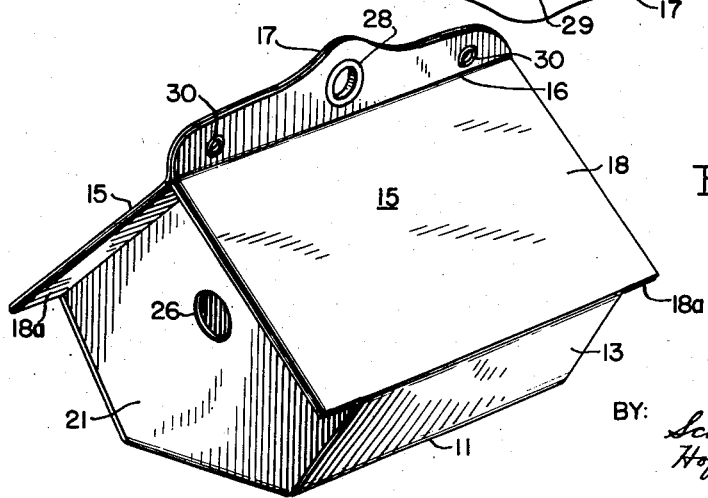

The completed structure, as is plain from Fig. 7 of the drawings, is of rather conventional and generally pleasing house-like appearance, and is complete ready to be hung from a tree branch or other support. The structure may be shipped collapsed, and the various panels forming the birdhouse are so proportioned that in its collapsed condition it fits easily into a standard mailing envelope of about 8" x 10" dimensions. The construction is such that all exposed surfaces of the assembled bird house are afforded by a single face of the sheet, so that the desired decorative paper facing need be applied only to one surface of the sheet.

Figure 1:
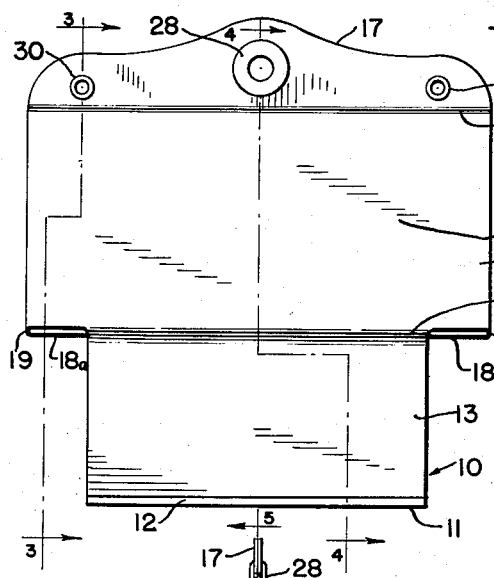
Figure 2:
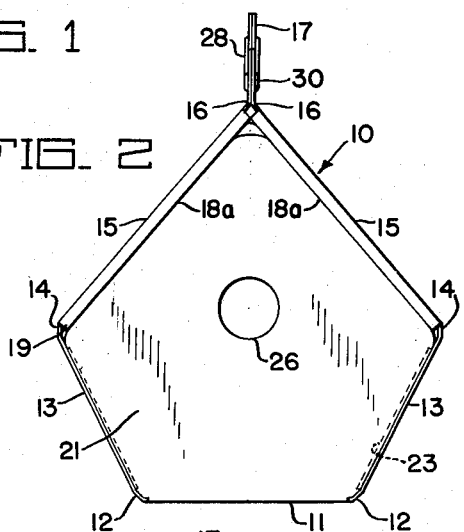
Figure 3:
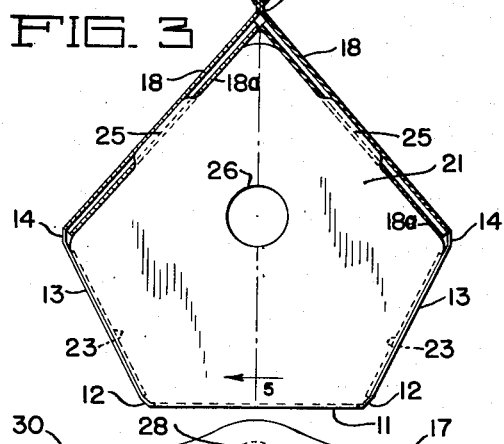
Figure 4:
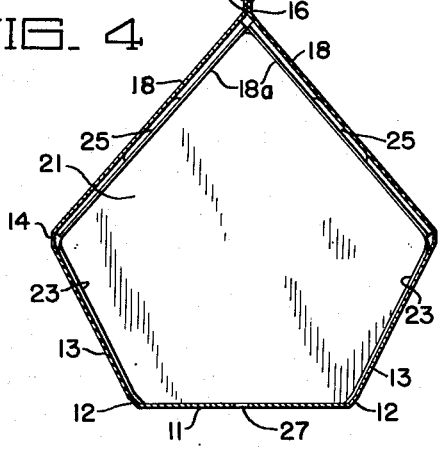
Figure 5:
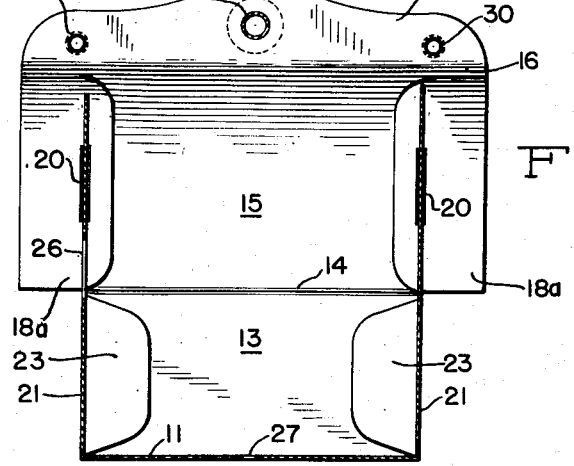
Figure 6:
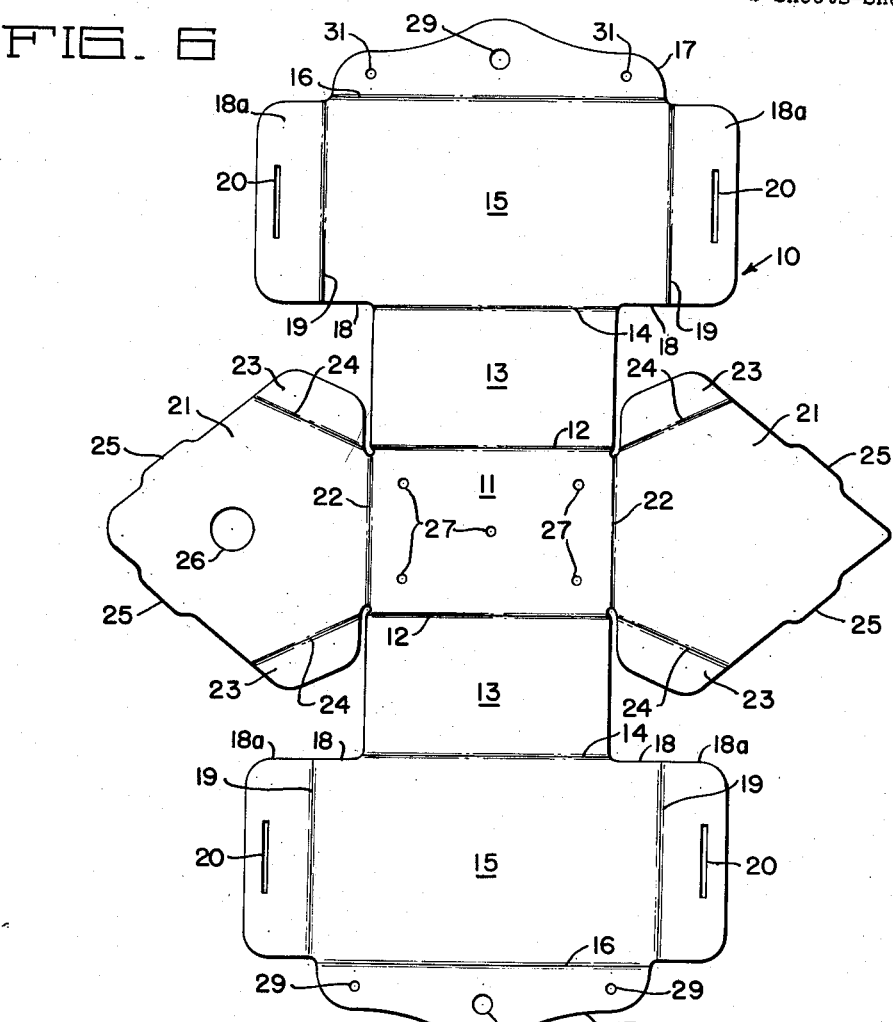

The invention is illustrated in a preferred embodiment in the accompanying drawings in which Fig. 1 is a side elevational view of a collapsible bird house made in accordance with the invention; Fig. 2 is an end elevation thereof; Fig. 3 is a section taken as indicated along the line 3—3 of Fig. 1; Fig. 4 is a section taken as indicated along the line 4—4 of Fig. 1; Fig. 5 is a section taken as indicated along the line 5—5 of Fig. 3; Fig. 6 is a plan view of a blank from which the bird house is formed; and Fig. 7 is a perspective view of the assembled bird house.

Referring to the drawings in greater detail, and referring particularly to Fig. 6, the device includes a body member, indicated generally at 10, which consists of a floor panel 11 which has hingedly connected to opposite margins by score lines 12 a pair of wall panels 13. Flanking each wall panel 13, and hingedly connected thereto by a score line 14 is a roof panel 15. Hingedly connected to each roof panel 15 by means of a score line 16 is a hanger tab 17, said hanger tabs being positioned at the longitudinal extremities of the body member. The lateral ends of the roof panels extend beyond the lateral margins of the wall panels to form eaves which are divided by score lines 19 into an eave top portion 18 and an eave tongue 18a. Each eave tongue 18a is provided with a slot 20. The rectangular tongues 18a form the under side of the eaves of the bird house.

At each lateral margin of the floor panel 11 is a side panel 21 which is of pentagonal shape and which is hinged to the floor panel by means of a score line 22. Each side panel 21 has along each of the margins which adjoin the wall panels 13 a continuous tab 23 which is hingedly connected to the side panel 21 along a score line 24. Along each margin of the side panels 21 which will abut a roof panel 15 in the assembled position of the bird house is a rigid projecting tab 25.

One of the side panels 21 is provided with a suitably sized round hole 26 to provide a means of ingress and egress for a bird. For a wren house the aperture 26 is customarily the size of a quarter. Preferably, a number of small ventilating apertures 27 are provided in the floor panel 11.

As previously pointed out, the blank from which the device is assembled is preferably made from laminated paperboard of the sort which is used for outdoor display cards, and one surface of the blank is covered with a lithographed paper which provides the decorative outer surface of the finished device.

A partial assembly operation is performed on the bird house to place it in its collapsed position. This involves bending the wall panels 13 upwardly along the score lines 12 so that the unfinished surfaces of the board are facing each other, and the roof panels 15 are bent toward each other along the score lines 14. Reverse bends are made along the score lines 16 to bring the unfinished surfaces of the hanger tabs 17 into facing relationship, and the tabs are secured together by means of a large center grommet 28 which extends through registering apertures 29 in the center of the hanger tabs 17, and smaller grommets 30 which extend through flanking apertures 31 in said tabs. The large grommet 28 provides a suitable reinforced aperture to receive a hanger wire or a dowel rod from which the assembled bird house may be suspended.

It will be noted that the roof panels 15 have a combined width equal to the combined width of the floor panel 11 and the two wall panels 13, so that the roof panels 15 may lie flat against the floor panel 11 and wall panels 13 in the collapsed position of the device; the bend between the panels being along the score lines 14, and the roof panels 15 lying in one plane while the floor panel 11 and wall panels 13 lie in another parallel plane.

To place the device in the most compact possible form for shipping, the eaves tongues 18a are turned inwardly against the adjacent marginal portions of the roof panels 15, and one side panel 21 has its hinged tabs 23 folded inwardly to lie along the inner face of the panel 21, and that side panel 21 is folded along its score line 22 to lie between the plane of the roof panels 15 and the plane of the floor panel 11 and wall panels 13. The other side panel 21 is bent in the opposite direction along its score line 22 so as to lie against the outer surface of the floor panel 11. The hanger tabs 17 may be bent sideways to lie flat against one of the roof panels 15 and the entire device is in its collapsed position suitable for shipping in a small envelope.

To place the bird house in its assembled position, the wall panels 13 are brought to a position projecting outwardly and upwardly with respect to the floor panel 11, and the roof panels 15 are brought to a position projecting inwardly and upwardly from the wall panels 13 so that the panels forming the body member 10 present a pentagonal cross-section. The side panel which was lying between the floor panel 11 and the roof panels 15 is swung up and the rigid tabs 25 are engaged with the slots 20 in the eave tongues 18a. The side panel 21 which lies against the outer surface of the bottom panel 11 in collapsed position is swung 270° about the score line 22, and its rigid tabs 25 engage with the slots 20 in the adjacent eave tongues 18a. The entire device is thus held in tension by the interlocking of the tabs 25 and slots 20. The retention of the device in its assembled position is aided by the downward thrust of the eave tongues 18a along their score lines 19 which tends to prevent the rigid tabs 25 from being disengaged from the slots 20. There is a tendency of the side panels 21 to bulge outwardly above the score lines 22, and the hinged tabs 23 of said side panels are turned inwardly, as best seen in Fig. 4, so as to lie along the inner faces of the wall panels 13 and close any gap which might otherwise exist between the ends of the wall panels 13 and the adjacent margins of the side panels 21.

The foregoing detailed description is given for clearness of understanding only and no unnecessary limitations are to be understood therefrom, it being known that some modifications will be obvious to those skilled in the art.

I claim:

1. A collapsible device of the character described, comprising: a body member of sheet material, said body member having a floor panel, a pair of wall panels, and a pair of roof panels all of which are hingedly connected together; means securing together the longitudinal end portions of said body member; a pair of side panels each of which is hinged along one of its margins to one of the lateral margins of said body member, each said side panel being swingable between a collapsed position and an assembled position perpendicular to each of the panels of said body member with a margin abutting a surface of each of such panels, and one of said side panels being provided with an opening; and a rigid projecting tab on a margin of each side panel to engage a slot in said body member to retain the device in assembled position.

2. The device of claim 1 in which the roof panels are adjacent the longitudinal extremities of the body member and the means securing together the longitudinal end portions of the body member comprise hanger tabs hinged to said roof panels which are permanently secured together in facing relationship.

3. The device of claim 1 in which the lateral ends of the roof panels extend beyond the lateral margins of the wall panels to form eaves which are hinged to provide eave tongues which turn under to form the undersides of the eaves, and the tabs on the side panels engage slots in said eave tongues.

4. The device of claim 1 in which the floor panel and two wall panels of the body member occupy the same linear length as the two roof panels, so that the device may be folded along the hinge lines between the wall panels and roof panels and assume a collapsed position with the roof panels in one plane and the floor and wall panels in another parallel plane.

5. The device of claim 1 in which the side panels are hinged to the floor panel, the rigid projecting tabs engage the roof panels and have hinged flaps to lie inside the wall panels and close the gaps between said side panels and said wall panels.

6. A collapsible device of the character described, and formed from a single piece of cardboard having one finished surface, comprising: a body member having a floor panel, a pair of wall panels hinged to opposite sides of the floor panel, a pair of roof panels hinged to opposite sides of the wall panels, said floor panel and two wall panels occupying the same linear length as the two roof panels whereby the body member may be collapsed to a rectangular form with the floor and wall panels in one plane and the roof panels in a parallel plane, said roof panels having eaves extending beyond the lateral margins of the wall panels, and a pair of hinged hanger tabs forming the longitudinal extremities of the body member; fastening means securing said hanger tabs with their unfinished surfaces together; and a pentagonal side panel hinged to each lateral margin of the floor panel, said side panels having rigid tabs to engage slots in the eaves to retain the device in assembled position with a margin of each side panel abutting each panel of the body member, and one of said side panels having an aperture.

7. The device of claim 6 in which the eaves are hinged to provide eave tongues which fold under to form the under surfaces of the eaves, and the slots to engage the tabs in the side panels are in said eave tongues.

8. A collapsible device of the character described, comprising: a body member of sheet material which has a plurality of body panels disposed side by side in a series, said panels being connected by hinge lines which are so positioned that said panels may assume a collapsed position in parallel planes or an assembled position enclosing a polygonal area, said body member having hanger portions at its ends which are attached together in facing relationship to form a hanger member, and a pair of side panels each of which is hinged along one of its margins to one of said body panels, said side panels having an edge for each body panel and being swingable between collapsed positions in planes parallel to those of the collapsed body panels and assembled positions substantially perpendicular to the assembled body panels with an edge abutting each body panel and portions engaging a part of said body member, whereby said device may be assembled or collapsed without unfastening said hanger portions.

9. The device of claim 8 in which the center body panel is a floor panel which is flanked on each side by a wall panel and a roof panel, the roof panels have portions extending beyond the lateral margins of the body member to provide eaves, and the side panels engage said eaves.

10. The device of claim 9 in which the total width of the two roof panels is the same as that of the floor panel and two wall panels.

NED BURR.
FRED DRUECK, JR.

References Cited in the file of this patent

UNITED STATES PATENTS

| Number | Name | Date |
|---|---|---|
| 502,457 | Craw | Aug. 1, 1893 |
| 619,757 | Johnstone et al. | Feb. 21, 1899 |
| 1,899,241 | Marr | Feb. 28, 1933 |
| 1,991,165 | Luckett | Feb. 12, 1935 |
| 2,008,443 | Froehlig | July 16, 1935 |
| 2,230,305 | Mallgraf | Feb. 4, 1941 |
| 2,424,733 | Benson | July 29, 1947 |